United States Patent
Tsai et al.

(10) Patent No.: US 8,289,377 B1
(45) Date of Patent: Oct. 16, 2012

(54) VIDEO MODE HIDDEN AUTOFOCUS

(75) Inventors: Richard Tsai, Arcadia, CA (US);
Xiaolei Liu, Los Angeles, CA (US)

(73) Assignee: DigitalOptics Corporation MEMS, Arcadia, CA (US)

(*) Notice: Subject to any disclaimer, the term of this patent is extended or adjusted under 35 U.S.C. 154(b) by 1446 days.

(21) Appl. No.: 11/848,996

(22) Filed: Aug. 31, 2007

(51) Int. Cl.
*H04N 13/02* (2006.01)

(52) U.S. Cl. ........... 348/47; 348/51; 348/64; 348/222.2; 348/345

(58) Field of Classification Search .............. 348/51, 348/64, 221.1, 222.2, 262, 47, 345; 396/77, 396/79, 140
See application file for complete search history.

(56) References Cited

U.S. PATENT DOCUMENTS

| | | | | |
|---|---|---|---|---|
| 5,974,272 | A * | 10/1999 | Kiesow et al. | 348/221.1 |
| 6,512,892 | B1 | 1/2003 | Montgomery et al. | |
| 6,809,760 | B1 * | 10/2004 | Takagi et al. | 348/211.9 |
| 7,559,026 | B2 * | 7/2009 | Girish et al. | 715/716 |
| 7,627,240 | B2 * | 12/2009 | Nikkanen | 348/208.12 |
| 2005/0179875 | A1 * | 8/2005 | Aoyanagi | 353/101 |
| 2007/0035654 | A1 | 2/2007 | Oochi | |
| 2008/0064437 | A1 * | 3/2008 | Chambers et al. | 455/556.1 |
| 2008/0218611 | A1 * | 9/2008 | Parulski et al. | 348/262 |
| 2010/0134642 | A1 * | 6/2010 | Thorn | 348/222.1 |

* cited by examiner

*Primary Examiner* — Ramy M Osman
(74) *Attorney, Agent, or Firm* — Haynes and Boone, LLP

(57) ABSTRACT

A method and system for hiding objectionable frames during autofocusing are disclosed. A personal electronic device such as a camera telephone can have two cameras that have overlapping fields of view. One camera can provide imaging. The other camera can facilitate autofocusing in a manner wherein images produced thereby are not viewed by a user. Because the autofocus frames are hidden, the user is not distracted or annoying thereby.

4 Claims, 4 Drawing Sheets

VIDEO MODE HIDDEN AUTOFOCUS

TECHNICAL FIELD

The present invention relates generally to video imaging. The present invention relates more particularly to a method and system for mitigating the display of unfocused frames during the autofocus process.

BACKGROUND

Autofocus mechanisms for cameras are well known. Such autofocus mechanisms typically move one or more lenses of a camera so as to achieve desired sharpness or focus of an image. Autofocus mechanisms can be either active or passive. Active autofocus mechanisms determine a distance to the subject and then move one or more lenses to a position that has been determined to provide proper focus for that distance. Passive autofocus mechanisms determine the sharpness of images as the focusing lens(es) are moved, so as to determine the particular position where the best focus is obtained.

The distance to the subject can be determined by measuring the time that it takes for a signal, such as infrared light or ultra high frequency sound, to travel to the subject then and bounce back to the camera. Triangulation or the amount of light reflected by a scene can also be used to determine distance.

Sharpness of the image can be determined by computer analysis. The lens or lenses are moved while the computer measures the sharpness of each image produced during the movement. The sharpest image can be considered to be the best focused imaged.

To determine sharpness, the computer can look at the difference in intensity between adjacent pixels of an imaging sensor. The frame that provides maximum intensity difference, at least for some portion of the image, is considered to be the best focus.

With either active or passive focusing, a selected portion of the image can be used to determine focus. For example, when a person is being photographed, the person is generally centered in the image. Thus, using the central portion of the image tends to result in the most desirable focus.

Although such autofocus mechanisms have proven generally suitable for their intended purpose, they do possess inherent deficiencies that tend to detract from their overall desirability. For example, contemporary digital autofocus cameras display each frame or image as the autofocus mechanism searches for the best focus. Thus, contemporary digital autofocus cameras typically display a number of unfocused images before displaying the final focused image. During the focusing process, the focus is constantly changing and an image can go in and out of focus several times as the autofocus mechanism attempts to determine the best focus.

Displaying such a series of images having constantly changing focus is undesirable. More particularly, displaying a scene while the focus is changing can be annoying and distracting. The distraction may even cause a user to miss the desired timing of a shot, particularly for a moving subject.

In view of the foregoing, it is desirable to provide a digital autofocus camera that does not display the unfocused images associated with the process used by the autofocus mechanism to determine the best focus while still maintaining a display of the video stream.

BRIEF SUMMARY

A system and method for enhancing the autofocus process is disclosed. According to an embodiment, a personal electronic device such as a camera telephone can comprise a plurality of cameras. For example, the personal electronic device can comprise two cameras. The cameras can be configured so as to image overlapping scenes.

One camera can be used to provide imaging and the other camera can be used to facilitate the autofocus process. Alternatively, both cameras can cooperate to facilitate the autofocus process, such as by use of triangulation or by the stereo effect. One of the cameras can provide video that does not include frames that are being tested for best focus. In this manner, the display of unfocused frames can be mitigated, while maintaining the display of the video stream.

An embodiment can comprise a method for performing autofocusing, wherein the method comprises using one camera to perform autofocusing and using another camera to provide imaging. The camera that provides imaging can continuously provide images that are not part of the autofocus process and thus tend to be substantially less annoying and distracting than the images that are part of the autofocus process. The images produced by the camera that is used for autofocusing are not displayed.

An embodiment comprises using two cameras to provide a stereo effect to determine a distance to a subject. The relative positions of objects in images from the two cameras can be indicative of their distance from the camera.

Benefits include improved enjoyment and ease of use of the cameras of personal electronic devices such as cellular telephones. More particularly, the annoyance and distraction caused by viewing out of focus frames during the autofocus process is mitigated.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A method and system for hiding objectionable frames during autofocusing are disclosed. Such objectionable frames include frames that are unfocused and/or changing in focus. A personal electronic device such as a cameral telephone can have two cameras that have overlapping fields of view. One camera can provide imaging. The other camera can facilitate autofocusing in a manner wherein images produced thereby are not viewed by a user. Because the autofocus frames are hidden, the user is not distracted or annoying thereby.

Contemporary autofocus cameras display frames while changing the focusing lens position during the autofocus process. One or more embodiments provide methods and systems that use multiple cameras to facilitate performance of the autofocus process in the background.

Figure 1:
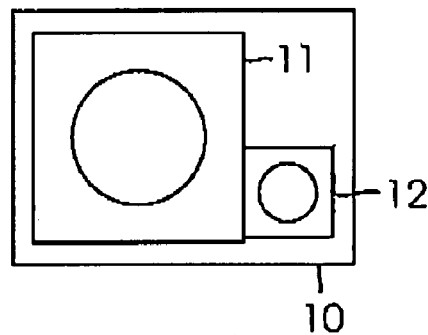
FIG. 1 is a semi-schematic drawing showing a personal electronic device, e.g., a cellular telephone, having two cameras, according to an example of an embodiment.

Referring now to FIG. 1, multiple cameras such as first camera 11 and second camera 12 can be positioned on the same side of a personnel electronic device 10 so that they point substantially in the same direction. One or more of the cameras can provide a displayed image, such as for preview video, while one or more other cameras collect information for autofocusing.

Traditional autofocus actuators are too slow to switch back to the original position. Besides, the position might be different from the original one due to hysteresis. The MEMS actuator could provide these advantages for this new method of AF that provides fast speed without jerking frames.

The video preview, the captured video, and/or any still image capture are not adversely affected by the autofocus process. Using a separate camera for the autofocus process advantageously isolates the autofocus process from the imaging process so as to minimize undesirable interference with the imaging process caused by the autofocus process.

Generally, the autofocus processor can see all of the frames provided by one of the cameras, while the display can see only frames that are not part of the autofocus process. In this manner, frames that are part of the autofocus process are hidden from view by the user.

The camera used for autofocusing can be a smaller, lower resolution, and/or less expensive camera (it can use a less expensive imager and/or lenses, for example) as compared to the camera used for imaging. Alternatively, the camera used for autofocusing can be larger, have more resolution, and/or be more expensive than the camera used for imaging.

Two cameras can be placed close to one another, so that the scenes provided thereby are approximately the same. Alternatively, the autofocus camera can on look at the center of the scene that is imaged by the imaging camera. The autofocus camera can perform autofocusing while the imaging camera is providing video for preview or capture. The autofocus camera can pass focus information as a mapping from the autofocus camera's distance function to the imaging camera's distance function. Then the focusing lens of the imaging camera can be moved to the position for best focus.

Figure 2:
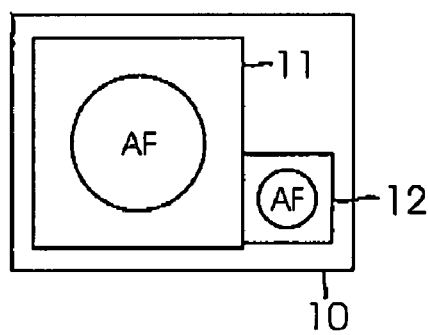
FIG. 2 is a semi-schematic drawing showing a personal electronic device, e.g., a cellular telephone, having two cameras, wherein both cameras are autofocus cameras, according to an example of an embodiment.

Referring now to FIG. 2, both the imaging camera 11 and the autofocus camera 12 can be autofocus cameras. That is, both can have movable or autofocus lenses. The autofocus camera 12 can provide information to the imaging camera 11 that facilitates positioning of the autofocus lens or lenses of the imaging camera 11 at the position for best focus. This information can be determined by the autofocus camera 12 performing autofocusing in any desired manner.

For example, autofocus camera 12 can use a structured search, with or without local searching, according to contemporary methodology to determine the distance to the subject and thus the best focus position of its own focusing lens. This information can then be used to determine the best focus position of the focusing lens of imaging camera 11.

Figure 3:
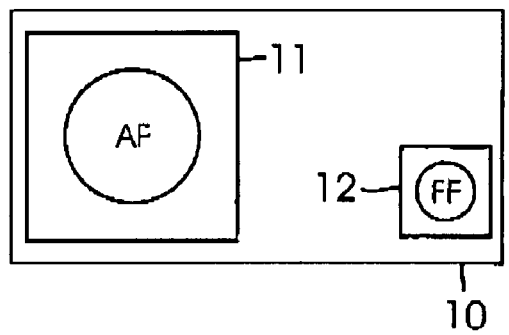
FIG. 3 is a semi-schematic drawing showing a personal electronic device, e.g., a cellular telephone, having two cameras, wherein one camera is an autofocus camera and the other camera is a fixed focus camera, according to an example of an embodiment.

Referring now to FIG. 3, an embodiment can comprise an autofocus camera 11 and a fixed focus camera 12. The imaging camera can be the autofocus cameral 11. The fixed focus camera 12 can be used to help determined the position of the focusing lens of the imaging camera. The two cameras are spaced apart from one another.

Generally, it is desirable to have the two cameras for FIGS. 1 and 2 as close to one another as can be accomplished. By way of contrast, the cameras of FIG. 3 require a distance therebetween. Distances of one to twenty centimeters are generally suitable. Other distances are also suitable. In this instance, the two cameras can cooperate to determine the distance to the subject for placement of the focusing lens of the imaging camera at a position for best focus.

Determining the distance to the subject can be done, for example, by determining how objects in an image vary in position from one camera to the other. As those skilled in the art will appreciated, when two cameras are spaced apart from one another and are aimed in generally the same direction (such as by having the light axes thereof approximately parallel to one another) as shown in FIG. 3, then images from both cameras will be similar. However, objects in the foreground will exhibit more shift from one camera to the other than do images in the background. The amount of such shifting is indicative of the distance between the cameras and the objects.

Figure 4:
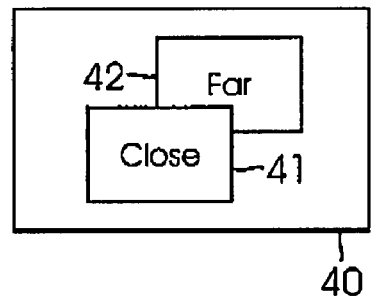
FIG. 4 is a semi-schematic drawing showing two objects in an image produced by one camera according to an example of an embodiment.
Figure 5:
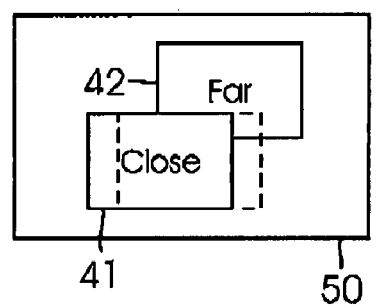
FIG. 5 is a semi-schematic drawing showing two objects in an image produced by another camera according to an example of an embodiment, wherein closer objects to the camera are shifted (with respect to their positions in the image produced by the other camera) more than farther objects.

Referring now to FIGS. 4 and 5, such shifting is shown. FIG. 4 shows an image from one camera, such as imaging camera 11 of FIG. 3. FIG. 5 shows an image from another camera, such as camera 12 of FIG. 3. In FIG. 5, the dashed lines show where the close object was in FIG. 4, to better show the shifting thereof.

Objects in the foreground, such as close object 41, appear to shift in position between the images FIGS. 4 and 5. This is due to the change in perspective between the two cameras. By way of contrast, images in the background, such as far objects 42 do not appear to have shifted substantially. The amount of such shifting is dependent upon the distance from the cameras to the objects. Thus, the amount of such shifting can be used to determine the distances to the objects and consequently to determine the focusing lens position for best focus. This shifting is referred to herein as the stereo effect.

One camera (the one not used for image, for example) can be a fixed focus camera, since it is the positions of the objects in the images that it forms, rather than the sharpness of the images, that is required according to this embodiment. Alternatively, cameras can be autofocus cameras.

The stereo effect can thus be used to facilitate autofocusing. The stereo effect can similarly be used to facilitate range finding generally.

Figure 6:
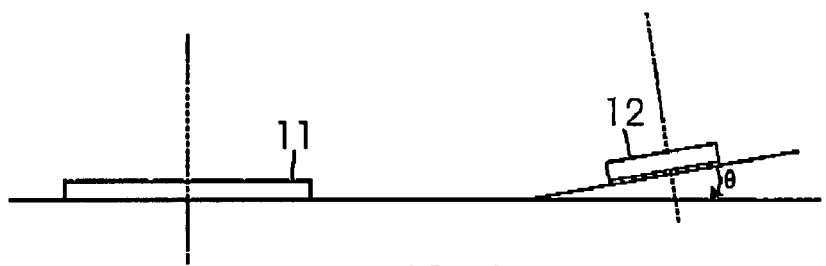
FIG. 6 is a semi-schematic drawing showing two cameras spaced apart from one another and having non-parallel light axes, according to an embodiment.

Referring now to FIG. 6, the two cameras 11 and 12 can be spaced apart and can have non-parallel light axes. This results in a stereo effect similar to that of FIGS. 3-5.

Figure 7:
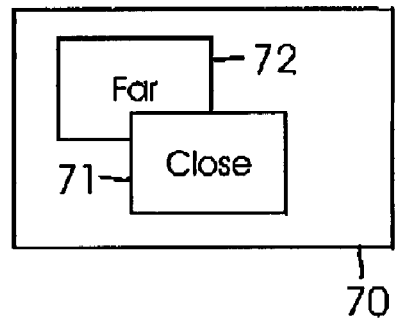
FIG. 7 is a semi-schematic drawing showing two objects in an image produced by one of the cameras of FIG. 6, according to an example of an embodiment.
Figure 8:
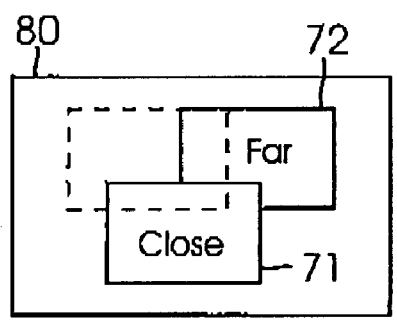
FIG. 8 is a semi-schematic drawing showing two objects in an image produced by the other of the cameras of FIG. 6, according to an example of an embodiment, wherein object shift their position in the image by an amount depending upon their distance from the cameras.

Referring now to FIGS. 7 and 8, such angling of the light axes of the two cameras can result in more pronounced shifting of the far objects 72 as compared to the near objects 71. In FIG. 8, the dashed lines show where the far object was in FIG. 7, to better show the shifting thereof.

Figure 9:
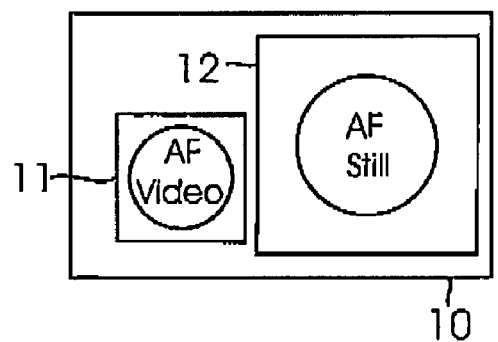
FIG. 9 is a semi-schematic drawing showing a personal electronic device, e.g., a cellular telephone, having two cameras wherein one camera is an autofocus video camera and the other is an autofocus still camera, according to an example of an embodiment.

Referring now to FIG. 9, one camera can be a video camera 11 and the other camera can be a still camera 12. The video camera 11 can have a lower resolution 12 than the still camera 12 and vice-versa. Both the video camera 11 and the still camera 12 can be autofocus cameras.

According to contemporary practice, a high resolution camera is commonly used in combination still/video applications. Images are initially formed at high resolution and are maintained at high resolution for still images. The images are sub-samples to reduce the resolution for video.

According to an embodiment, two separate cameras are provided. Both video camera 11 and a still camera 12 are provided so that while imaging for video, a user can obtain a high quality still image at the same time. When the still camera 12 is not taking a picture, the still camera 12 can perform autofocusing as described above. The autofocus information can be used by the video camera (as well as by the still camera for making still images).

Two cameras used according to one or more embodiments can swap functions. That is, a first camera can be used for imaging and a second camera can be used for autofocus, then at a different time the first camera can be used for autofocus and the second camera can be used for imaging.

Alternatively, each camera can have a dedicated function. Thus, the first camera can always be used for imaging and the second camera can always be used for autofocus.

Figure 10:
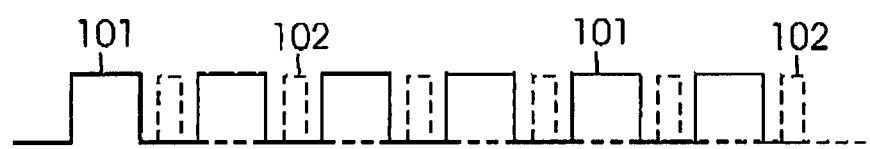
FIG. 10 is a timing diagram for a single imaging sensor, showing a series of short autofocus frames wherein each autofocus frame is between two image frames, according to an example of an embodiment.
Figure 11:
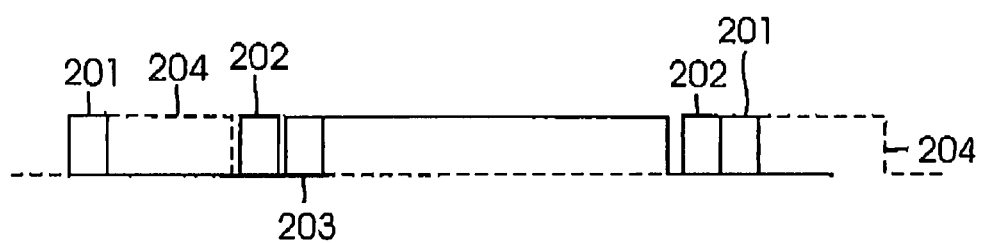
FIG. 11 is a timing diagram showing an enlarged frame valid signal for the exposure of the first row in an electronic rolling shutter camera.

Referring now to FIGS. 10 and 11, autofocus can be provided using a single camera or imager according to examples of embodiments. In such instances, autofocus frames can be interspersed with image (normal) frames as discussed below.

With particular reference to FIG. 10, a single imaging sensor can be configured to output two frames for each imaging cycle. The first frame of each imaging cycle, for example, can be a normal video frame 101 having a normal size or duration. The second frame of each imaging cycle, for example, can be substantially shorter in length or duration (and correspondingly smaller is data quantity), as compared to the first frame, and can be an autofocus frame 102. Such normal frames 101 and autofocus frames 102 can alternate indefinitely to form a series thereof, as shown in FIG. 10.

The alternating series of normal frames 101 and autofocus frames 102 can comprise any number of autofocus frames 102 inserted between any number of normal frames 101. For example, one autofocus frame 102 can be inserted between single normal frames 101 (as shown in FIG. 10), one autofocus frame 102 can be inserted between pairs of normal frames 101, one autofocus frame 102 can be inserted between sets of three normal frames 101, and two autofocus frames 102 can be inserted between single normal frames 101. Any desired combination or series of normal frames 101 and autofocus frames 102 can be used. Indeed, the number of autofocus frames 102 can vary, depending upon such factor as user input (such as desired resolution or image quality), ambient light level, aperture size, sharpness of last focus, etc.

The normal frames 101 can be displayed and/or stored as is done according to contemporary practice. Thus, the normal frames 101 are the frames can comprise still or video imagery.

The autofocus frames 102, which are provided by the same imaging sensor as the normal frames 101, are used to facilitate autofocusing. The autofocus frames 102 can be used to facilitate autofocusing according to any desired method. For example, the autofocus frames 102 can be used to determine a lens position for the normal frames 101 wherein sharpness or contrast tends to be maximized, such a by using a modulation transfer function.

This embodiment is particularly suitable for use with an imaging sensor that utilizes a global shutter, e.g., a shutter that affects substantially all of the sensor's pixels substantially simultaneously. A mechanical shutter is an example of a global shutter.

With particular reference to FIG. 11, an enlarged frame valid signal timing diagram showing exposure for the first row, for example, of a complimentary metal oxide semiconductor (CMOS) imaging sensor is provided. When a global shutter is not used, then reduced exposure can result. For example, when the imaging sensor utilizes an electronic rolling shutter (ERS), such as that utilized by CMOS sensors, then the autofocus exposure can be substantially less that the exposure provided during normal operation of the imaging sensor.

The autofocus exposure 201 of an imaging sensor using ERS is substantially shorter than the video exposure 202. The length of the autofocus exposure time 201 is limited by the length of time that is required for positioning of the lens, i.e., the lens moving time 202.

The autofocus exposure time 201 must be short enough to allow sufficient lens moving time 202 so that the lens in properly positioned (in focus) for the video exposure 2003. The autofocus exposure time 201, lens positioning time 202, and the video exposure 203 must all occur between the frame valid timing signal high states 204, as shown by the dashed lines.

The embodiment of FIGS. 10 and 11 can be combined with a two camera embodiment described above. For example, one camera can be used to image video while the other camera is being used to take still pictures according to the method described in conjunction with FIGS. 10 and 11.

As used herein, the term camera can refer to a digital camera. However, at least in some instances, a film camera can also be suitable.

Since the frames generated to facilitate autofocusing are hidden from viewing by the user, the user is not annoyed or distracted by such frames. Therefore, the use utility of a personal electronic device having such hidden autofocus is substantially enhanced.

Embodiments are suitable for use in a variety of different personal electronic devices, such as cellular telephones, personal digital assistances (PDAs), pocket computers, and laptop computers. Embodiments of are suitable for use in a variety of applications, such as security and surveillance.

Any desired number of cameras may be used according to various embodiments. Two, three, four, five, six, or more cameras may be used. For example, one camera can be used for imaging while one, two, or more cameras are used for autofocusing.

One or more embodiments are suitable for use in either full motion, e.g., video, or still camera. Thus, the word video as used herein can generally apply to single frame still imaging, as well as multiple frame video imaging.

One or more embodiments of the present invention can use a micro-electromechanical system actuator to move the lens rapidly and substantially without hysteresis. In this manner, the undesirable occurrence of jerking frames can be mitigated. One example of such a MEMS actuator is disclosed in U.S. patent application Ser. No. 11/190,307, filed on Jul. 26, 2005, and entitled MEMS Digital Linear Actuator, the entire contents of which are hereby incorporated by reference.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A personal electronic device comprising:
   a plurality of cameras;
   a display configured to cooperate with the plurality of cameras so as to not display images that are provided by a one of the plurality of cameras that is performing an autofocus process while displaying images from another of the plurality of cameras that is not performing the autofocusing process;
   an autofocus processor configured to use images from the one of the plurality of cameras for performing the autofocusing process; and
   wherein the plurality of cameras are configured to image overlapping scenes.

2. The personal electronic device as recited in claim 1, wherein:
   the autofocus processor is configured to use images from the plurality of cameras for autofocusing.

3. The personal electronic device as recited in claim 1, wherein the plurality of cameras comprise:
   an imaging camera configured to store an image; and
   an autofocusing camera configured to facilitate autofocusing.

4. The personal electronic device as recited in claim 1, wherein the plurality of cameras comprise:
   an imaging camera configured to store an image; and
   an autofocusing camera configure to facilitate autofocusing, the autofocusing camera having a lower resolution that the imaging camera.

* * * * *